United States Patent [19]

Blok et al.

[11] Patent Number: 4,461,793
[45] Date of Patent: Jul. 24, 1984

[54] PRINTABLE COATING FOR HEATSHRINKABLE MATERIALS

[75] Inventors: Lyubov Blok, Milwaukee; David G. Jewell, Franksville, both of Wis.

[73] Assignee: W. H. Brady Co., Milwaukee, Wis.

[21] Appl. No.: 464,273

[22] Filed: Feb. 7, 1983

[51] Int. Cl.$^3$ ............................................. B32B 27/04
[52] U.S. Cl. ..................................... 428/36; 428/219;
428/341; 428/423.7; 428/446; 428/480;
428/483; 428/702; 428/910; 428/913; 524/425;
524/442; 524/601
[58] Field of Search ...................... 428/483, 36, 423.7,
428/910, 913, 480, 219, 341, 446, 702;
174/DIG. 8; 524/442, 425, 601

[56] References Cited

U.S. PATENT DOCUMENTS 4,391,767 7/1983 Pears .................................. 428/483

Primary Examiner—George F. Lesmes
Assistant Examiner—P. R. Schwartz
Attorney, Agent, or Firm—Quarles & Brady

[57] ABSTRACT

An identification device (10,20) having a heatshrinkable plastic substrate and a printable layer (12) over an exterior surface thereof comprising a polyester resin, calcium carbonate and a silicate compound. The printable layer forms a smooth surface for the application of alphanumeric identification indicia and retains such smooth surface upon heatshrinking of the substrate up to 50% in one direction.

5 Claims, 4 Drawing Figures

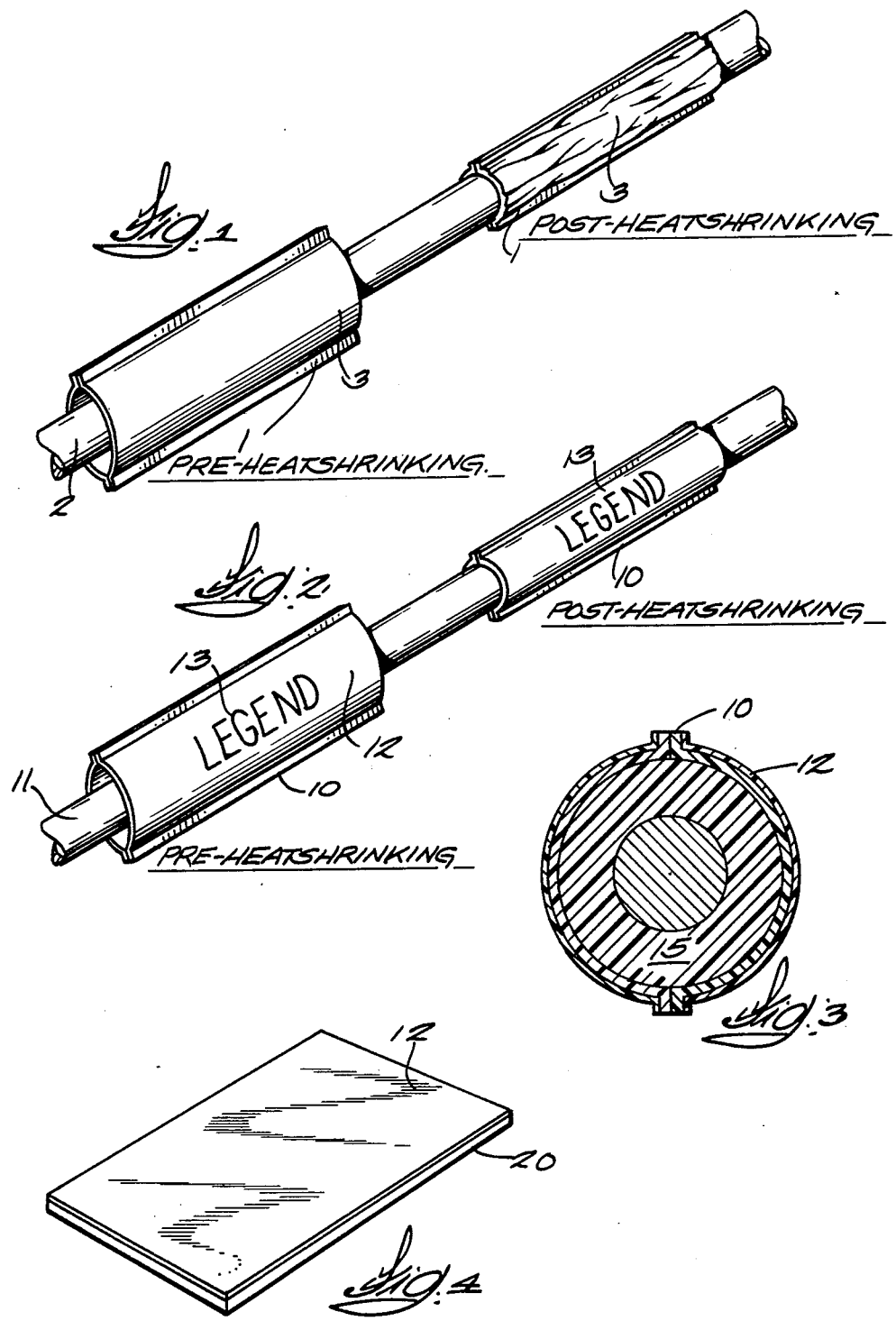

ic coating, therefore, is applied to the devices that is capable of receiving and retaining printed indicia. Various types of printable coatings may be employed with non-heatshrinkable identification devices that will exhibit good adhesion to the devices and good retention of the applied printed data. However, these same coatings are not suitable for heatshrinkable identification devices because they lose adhesion and become wrinkled when subjected to heat.

PRINTABLE COATING FOR HEATSHRINKABLE MATERIALS

TECHNICAL FIELD

This invention relates to a coating that can be applied to heatshrinkable base materials and which forms a layer capable of being printed and then heatshrunk in a smooth even manner without losing adhesion to the base material.

BACKGROUND ART

Some types of identification systems employ a heatshrinkable element that becomes snugly applied to an article after being subjected to heat. An example of this is a heatshrinkable marker sleeve used to identify an electrical wire or similar object. The marker sleeve has a diameter larger than that of the wire and fits loosely about the wire when first inserted on it. The sleeve is thereafter subjected to hot air so as to shrink and tightly conform to the periphery of the wire.

Heatshrinkable marker sleeves are made of various types of plastic films or resins that are unidirectionally oriented so as to shrink upon the application of heat. It is generally necessary to apply identification data to the marker sleeve, which may consist of a serial number, name, or other alphanumeric data, in order to identify a specific article to which the sleeve is applied. A user may apply identification data by printing systems typically available in various plants or offices, such as by a typewriter or computer printer, or manually with a writing pen.

Plastic materials of which identification devices such as marker sleeves are made cannot always be printed conveniently or acceptably with the above types of printing systems. A printable coating, therefore, is applied to the devices that is capable of receiving and retaining printed indicia. Various types of printable coatings may be employed with non-heatshrinkable identification devices that will exhibit good adhesion to the devices and good retention of the applied printed data. However, these same coatings are not suitable for heatshrinkable identification devices because they lose adhesion and become wrinkled when subjected to heat.

One solution to this problem is the use of hot stamping techniques to apply alphanumeric indicia onto heatshrinkable sleeves. This is not altogether satisfactory because hot stamping is a labor intensive operation and requires special equipment which many companies do not normally employ. A second prior art solution involves the use of radiation treated inks and requires special equipment for printing the sleeves, or modification of equipment such as typewriters. This technique also is not satisfactory because of the expense of the special equipment and materials required, and because the printed images exhibit relatively poor adhesion to the sleeve and generally can be rubbed off with finger pressure.

No suitable printable coatings for heatshrinkable identification devices have been available, so far as we are aware, prior to the invention disclosed herein. The deficiencies of the prior art printable coatings and inadequacies of the alternative known procedures discussed above were the impetus for the development of the present invention.

DISCLOSURE OF INVENTION

Our present invention provides a printable coating useful for application to heatshrinkable identification devices including (a) a saturated solvent-soluble polyester film forming resin, (b) calcium carbonate, and (c) a silicate compound. A pigment to produce an opaque coating in a selected color may also be included. It has been found that a printable coating of this composition exhibits excellent receptivity of inks generally used to print legends, can shrink up to 50% when applied to a plastic film without wrinkling and without losing adhesion to the film, and has excellent abrasion resistance. The main objectives of this invention were to provide printable layers for heatshrinkable articles having these useful performance characteristics.

DESCRIPTION OF THE DRAWINGS

Our invention is described hereinbelow in the full and concise terms required under 35 U.S.C. Sec. 112 by reference to the accompanying drawings, in which:

FIG. 1 is a perspective view of a wire with heatshrinkable sleeves illustrating the adverse effects of an improperly functioning printable coating;

FIG. 2 is a perspective view of a wire carrying heatshrinkable sleeves having an exterior printable coating according to the present invention;

FIG. 3 is a cross sectional view of a heatshrunk sleeve as illustrated in FIG. 2; and FIG. 4 is a perspective view of a flat identification device incorporating a heatshrinkable printable coating of the present invention.

BEST MODES FOR CARRYING OUT THE INVENTION (a) Background Description

FIG. 1 illustrates a heatshrinkable marker sleeve 1 positioned about a wire 2. The drawing shows the marker sleeve before and after heatshrinking.

The marker sleeve 1 is made of a unidirectionally oriented plastic film with the direction of orientation extending circumferentially about the sleeve. The exterior of the sleeve is coated with a printable coating 3 of a composition typically applied to plastic films, of which various formulations are known in the art. An example of one such composition of this type employs a vinyl resin and solids to form an opaque coating that will retain a printed legend. The coating 3 forms a smooth layer about the sleeve in its pre-heatshrinking condition illustrated in FIG. 1. The diameter of the sleeve is substantially larger than the diameter of the wire and the sleeve can be readily applied to the wire and moved to any desired position.

After being subjected to heat, generally a stream of hot air, the sleeve 1 shrinks or contracts circumferentially so as to tightly conform to the outer circumference of the wire. Plastic materials typically used for a sleeve of this type usually are capable of shrinking up to 50% in the direction of orientation. The post-heatshrinking condition of the sleeve is also illustrated in FIG. 1. It will be noted that the sleeve has developed a wrinkled or rippled surface after heatshrinking. This adverse appearance and deleterious surface condition of the post-heatshrunk sleeve is the result of the inability of the coating 3 to shrink uniformly in concert with shrinking of the plastic film of which the sleeve is made, so that the coating no longer forms a smooth layer after heatshrinking is completed. This condition of the post-heatshrunk sleeve 1 presents an unattractive appearance that is not acceptable to most end users of heatshrinkable sleeves and can also reduce the legibility of a legend applied to the exterior of the marker sleeve, thereby impairing the identification function of the sleeve.

(b) Description of the Invention

FIG. 2 illustrates a marker sleeve 10 positioned about a wire 11 and shows the condition of the marker sleeve 10 before and after heatshrinking.

The marker sleeve 10 is also made of a unidirectionally oriented plastic film with the direction of orientation extending circumferentially about the marker sleeve, as with sleeve 1. The exterior surface of the sleeve 10 is covered with a printable layer 12 according to the present invention, which forms a smooth layer about the exterior of the sleeve on which a legend 13 is printed. The formulations of coatings for the layer 12 are described in greater detail below. After the sleeve 10 is subjected to heatshrinking conditions, the sleeve contracts circumferentially and tightly conforms to the circumference of the wire 11. However, unlike the case with the sleeve 1 of FIG. 1, the printable layer 12 remains a smooth layer and retains its adhesion to the sleeve even after heatshrinking, instead of exhibiting the adverse post-heatshrunk condition of the coating 3 of FIG. 1. Therefore, the legend 13 applied to the marker sleeve is as legible after heatshrinking as it was prior to heatshrinking, albeit slightly smaller in size especially with respect to the height dimension.

The heatshrunk condition of the marker sleeve 10 is further illustrated in the cross-sectional view of FIG. 3. After heatshrinking, the sleeve 10 tightly conforms to the outer exterior surface of the layer of insulation 15 of the wire 11. Also, however, the printable layer 12 shrinks along with the shrinking of the sleeve 10 so that it conforms to the outer surface of the sleeve and does not develop wrinkles, lose adhesion to the sleeve 10 or cause wrinkling of the sleeve itself.

FIG. 4 illustrates a printable layer 12 applied to a flat identification device 20 made of heatshrinkable plastic film, and which may also include a layer of suitable adhesive on its opposite surface for application to an object.

(c) Coating Composition

The printable layer 12 of this invention is applied as a coating compounded of a polyester resin and two types of solid particulates.

The polyester resin is a solvent soluble, saturated film-forming solid material with an average molecular weight of about 40,000–65,000. It serves as the binder for other components of the coating and forms a flexible coating when dried by removal of the solvent. The polyester must be present in sufficient quantity in the coating formulation to form a continuous film when dried. Polyester resins of the foregoing type are commercially available. An especially useful resin for the printable coating 12 is Dupont's 49000 polyester which is said by Dupont to be the reaction product of ethylene glycol with saturated aromatic and aliphatic dibasic acids, believed to be phthalic and adipic acids. This resin has a hydroxyl number of 10, an acid number of 2, glass transition temperature of +86° F. and an average molecular weight of about 50,000. Another useful commercially-available polyester resin is Goodyear's Vitel polyester VPE 5987A, which is a linear polyester with an intrinsic viscosity of 0.87, hydroxyl number of 35–50, acid number less than 5, glass transition temperature of about +81° F., and an average molecular weight of about 60,000.

Two different solid particulates are to be admixed with the polyester film-forming resin for the printable coating 12, calcium carbonate and a silicate compound. The two solids are included in the coating to impart print receptivity, and we have found that both must be present in order to obtain a functional heatshrinkable printable coating and neither one by itself provided adequate ink receptivity. The silicate compound may be, for example, silicon dioxide, magnesium silicate, diatomaceous earth, etc., and the calcium carbonate is preferably a precipitated compound produced by chemical means.

A pigment may be compounded with the above ingredients to provide an opaque coating in a selected color. Titanium dioxide is a suitable pigment to produce a white coating. The coatings may be formulated in various other colors, such as red, blue, orange, green, brown and yellow, by the use of a suitable pigment. For example, lampblack can be used instead of titanium dioxide to produce a black coating, and C.I. Pigment Yellow 14 can be used instead of titanium dioxide to form a yellow coating. Also, colored pigments can be combined with titanium dioxide to form a colored coating.

The general formulation for the coating for the printable layer 12 is as follows, expressed on a percentage by weight basis of the total solids:

| Component | Operative Range | Preferred |
| --- | --- | --- |
| (1) Polyester resin | 50–62% by weight | 56% |
| (2) Calcium carbonate | 16–20% by weight | 18% |
| (3) Silicate compound | 9–16% by weight | 11% |
| (4) Pigment | 10–18% by weight | 15% |

Our development work has established that the operative ranges listed above are critical to obtaining a properly functioning printable coating for heatshrinkable identification devices. If the polyester is present in an amount less than the stated range, the coating will wrinkle upon heatshrinking; and if the polyester is present in excess of the range, the coating has poor ink receptivity. If the proportion of calcium carbonate is less than the stated range, the coating has poor ink receptivity, and if in excess of the stated range the coating will wrinkle upon heatshrinking. Also, if the silicate compound is present in a lesser amount than stated, the coating has poor ink receptivity; and if it is present in an excess of the stated range, the coating has too high a viscosity to enable proper application and the coating will wrinkle upon heatshrinking.

The above ingredients are formulated in a blend of suitable solvents to provide solubility of the polyester and to impart reasonable stability and aesthetics of the coating upon drying. The coating is applied to a heatshrinkable plastic substrate and then heated to evaporate the solvents and form a dry layer on the substrate. The coating weight applied to the substrate can be varied within a wide range, although care must be taken not to apply an excessive amount of coating as wrinkling will then result. Our work to date indicates coating weights in the range of about 2 to 11 lbs. of dry coating per 3,000 sq. ft. of base material produce operable results, with coating weights in the range of 5 to 7 lbs. of dry coating per 3,000 sq. ft. of base material providing optimum results.

When pigment is included in the coating to impart color or opacity, the quantity will vary with the type of pigment. For a white printable coating, we have found that from 10 to 18% by weight of titanium dioxide, preferably about 15%, provides optimum results. The quantity of pigment incorporated in the formulation also depends upon the degree of opacity desired in the final coating. With titanium dioxide, for example, less than 10% provided insufficient opacity, where as more than 18% had no additional effect on the opacity of the coating.

Under some conditions, it may also be desirable to add a small proportion of a cross-linking compound to aid in retaining adhesion of the coating to a substrate material during some types of manufacturing techniques such as sonic sealing at production rates. A polyisocyanate, particularly an aliphatic isocyanate, may be added to the coating for this purpose in an amount equal to 2 to 5% of the polyester resin solids.

EXAMPLE 1

A coating solution was formulated of the following composition:

|  | % by weight of coating solution | % by weight of solids |
|---|---|---|
| Solids |  |  |
| (1) Polyester resin | 20.0% | 56.2% |
| (2) Calcium carbonate | 6.4 | 18.0 |
| (3) Silicon dioxide | 4.0 | 11.2 |
| (4) Titanium dioxide | 5.2 | 14.6 |
| Solvent |  |  |
| (1) Toluene | 8.2 | — |
| (2) Methyl ethyl ketone | 8.2 | — |
| (3) Nitromethane | 48.0 | — |
|  | 100.0% | 100.0% |

The coating was applied to a unidirectionally oriented high density polyethylene film and baked at 150° F. for two minutes to evaporate the solvents. The dried layer was a smooth opaque white layer that exhibited good adhesion to the film and excellent receptivity to printing such as applied by a typewriter and a ballpoint pen. After the coated film was heatshrunk, the layer remained smooth without any wrinkling, retained its ink receptivity, and its adhesion to the film was not impaired. Legends applied to the layer prior to heatshrinking remained fully legible after heatshrinking. The coating was judged to be an excellent printable coating for heatshrinkable identification devices.

EXAMPLE 2

A coating solution was prepared with the following composition:

|  | % by weight of coating solution | % by weight of solids |
|---|---|---|
| Solids |  |  |
| (1) Polyester resin | 20.0% | 55.0% |
| (2) Calcium carbonate | 6.4 | 17.5 |
| (3) Silicon dioxide | 4.0 | 11.0 |
| (4) Titanium dioxide | 5.2 | 14.3 |
| (5) Polyisocyanate | 0.8 | 2.2 |
| Solvent |  |  |
| (1) Toluene | 8.2 | — |
| (2) Methyl ethyl ketone | 7.1 | — |
| (3) Nitromethane | 48.0 | — |
| (4) Other, from Polyisocyanate (5) | 0.3 | — |
|  | 100.0% | 100.0% |

The coating, when applied to the same film as used in Example 1 and dried in the same manner, formed a printable layer with the same characteristics as the printable layer of Example 1. Further, the addition of polyisocyanate aided in preserving adhesion of the coating to the base film during vigorous conditions developed by sonic sealing at production speeds. The polyisocyanate in the above formulation was the reaction product of three moles of 1.6 hexamethylene diisocyanate with one mole of water, and was added as 75% solids in equal parts of xylene and ethyl glycol acetate.

EXAMPLE 3

The coating of Example 1 was applied to unidirectionally oriented heatshrinkable base materials consisting of (1) low density polyethylene film and (2) rigid polyvinyl chloride material. The coating functioned as described in Example 1 on both of these base materials.

EXAMPLE 4

A yellow printable coating was prepared of the following formulation:

|  | % by weight of coating solution | % by weight of solids |
|---|---|---|
| Solids |  |  |
| (1) Polyester resin | 20.0% | 56.2% |
| (2) Calcium carbonate | 6.4 | 18.0 |
| (3) Silicon dioxide | 4.0 | 11.2 |
| (4) C. I. Pigment Yellow 14 | 5.03 | 14.1 |
| (5) Titanium dioxide | 0.17 | 0.5 |
| Solvent |  |  |
| (1) Toluene | 8.2 | — |
| (2) Methyl ethyl ketone | 8.2 | — |
| (3) Nitromethane | 48.0 | — |
|  | 100.0% | 100.0% |

The coating when applied to the substrate of Example 1 and dried produced an opaque yellow layer on the substrate which formed a printable layer having the same characteristics as the coating of Example 1.

EXAMPLE 5

For purposes of comparison, a printable coating made with a polyvinyl chloride resin and another made with an acrylic resin, both of which are suitable as printable coatings for non-heatshrinkable identification devices were tested for use on heatshrinkable identification devices. Both coatings exhibited loss of adhesion and wrinkling upon heatshrinking of the base film (a high density polyethylene film) and were therefore unsuitable as printable layers for heatshrinkable identification devices. Also, a polyvinyl chloride resin was substituted for the polyester resin in the coating formulation of Example 1, but was found to have poor adhesion to the base film and formed a soft coating with no abrasion resistance and therefore unsuitable for the intended use.

The coated articles of Examples 1-4 were tested for abrasion resistance of the printable layer 12 according to the procedure of MIL-STD-202E dated Sept. 4, 1978, Method 215. This procedure involves immersing the coated articles three separate times in various solvents followed by brushing after each immersion. All of the printable layers of these examples exhibited no significant deterioration under these test conditions, thereby demonstrating their excellent abrasion resistance.

There has thus been described a printable layer for heatshrinkable identification devices that is formed from dried coatings of specified composition wherein certain solid ingredients within stated quantity ranges are combined to provide an operable coating. The new printable layers are compounded within described parameters to provide a balance of essential properties: excellent adhesion to heatshrinkable substrates; retention of a smooth, unwrinkled surface even when heatshrunk up to 50%; retention of adhesion to heatshrinkable substrates when heatshrunk up to 50%; maintenance of full legibility of a legend after heatshrinking; and excellent abrasion resistance. The new printable layers described herein can be printed with any of the usual techniques employed in this art, such as with a typewriter, computer printer, pen, and the like, for the application of alphanumeric legends to identification devices.

We claim:

1. A heatshrinkable indentification device comprising, in combination:
    (1) a unidirectionally oriented plastic substrate heatshrinkable up to 50% in one direction, and
    (2) a printable layer over an exterior surface of the substrate comprising about 2 to 11 lbs. of dry coating per 3,000 sq. ft. of substrate of a dried coating having, on a percent by weight of solids basis, (a) 50–62% of a solvent soluble, saturated film-forming polyester resin solid, (b) 16–20% calcium carbonate, (c) 9–16% of a silicate compound, and (d) 10–18% pigment other than calcium carbonate or a silicate compound, said printable layer forming a smooth surface for the application of alphanumeric identification indicia and retaining such smooth surface upon heatshrinking of the plastic substrate up to 50% in one direction.

2. An identification device according to claim 1 wherein:
    the plastic substrate is a marker sleeve having opposed open ends.

3. An identification device according to claim 1 or 2 wherein:
    the pigment is titanium dioxide and the printable layer is a white opaque layer.

4. An identification device according to claim 1 or 2 wherein:
    the pigment includes a colored pigment to form a colored opaque printable layer.

5. An identification device according to claim 1 or 2 wherein:
    the printable layer includes an isocyanate compound for cross-linking the polyester resin, the isocyanate compound being present in an amount of 2–5% of the polyester resin solid.

* * * * *